United States Patent [19]

Newman

[11] 4,039,709
[45] Aug. 2, 1977

[54] INSULATED WALLPAPER

[75] Inventor: Arnold H. Newman, Beverly Hills, Calif.

[73] Assignee: West Coast Quilting Company, Los Angeles, Calif.

[21] Appl. No.: 583,673

[22] Filed: June 4, 1975

Related U.S. Application Data

[63] Continuation-in-part of Ser. No. 455,308, March 27, 1974, abandoned.

[51] Int. Cl.² .......... B32B 3/26; B32B 5/18; B32B 7/08; B32B 7/14
[52] U.S. Cl. .......... 428/159; 112/440; 428/40; 428/107; 428/162; 428/163; 428/198; 428/286; 428/287; 428/288; 428/322; 428/354; 428/913; 428/920
[58] Field of Search .......... 428/159, 198, 245, 252, 428/286, 287, 288, 322, 913, 920, 107, 162, 163, 172, 320

[56] References Cited

U.S. PATENT DOCUMENTS

| 2,562,711 | 7/1951 | Gessler et al. | 428/286 |
|---|---|---|---|
| 3,511,335 | 5/1970 | Uddenborg | 428/159 |
| 3,522,140 | 7/1970 | Hartzell | 428/320 |
| 3,541,620 | 11/1970 | Chapuis | 428/322 |
| 3,542,638 | 11/1970 | Kenny | 428/287 |
| 3,591,401 | 7/1971 | Snyder et al. | 428/322 |
| 3,622,527 | 11/1971 | Dieterich | 428/159 |
| 3,629,034 | 12/1971 | Kuroda | 428/159 |
| 3,637,458 | 1/1972 | Parrish | 428/320 |
| 3,748,217 | 7/1973 | May et al. | 428/322 |
| 3,778,337 | 12/1973 | Mand et al. | 428/320 |
| 3,811,996 | 5/1974 | Polk | 428/159 |

Primary Examiner—James C. Cannon
Attorney, Agent, or Firm—Dressler, Goldsmith, Clement, Gordon & Shore, Ltd.

[57] ABSTRACT

An insulating, multilayer quilted wallpaper web comprising a non-woven facing sheet having fire-retardant properties, a face side provided with a decorative pattern and a back side, an intermediate insulating layer substantially coextensive with the facing sheet and having one side contiguous to the back side of the facing sheet, and a non-woven backing sheet substantially coextensive with the insulating layer and contiguous to the other side of the insulating layer. The facing sheet and the backing sheet are relatively thinner than the insulating layer and are intermittently secured to the insulating layer to form a quilted unitary web.

7 Claims, 3 Drawing Figures

INSULATED WALLPAPER

CROSS-REFERENCE TO RELATED APPLICATION

This application is a continuation-in-part of U.S. Ser. No. 455,308, filed on Mar. 27, 1974, and now abandoned.

BACKGROUND OF THE INVENTION

This invention relates to wall coverings. More particularly, this invention relates to quilted wallpaper webs having insulating properties.

Wallpaper is a commonly used decorative wall covering which is made from such materials as cotton, linen, hemp, wood and straw fibers, waste paper and similar sheet materials having the necessary strength characteristics. Most commercial wallpaper is printed on roller presses. From the printing presses the wallpaper is transported through a dryer, cut into segments of a desired width and length, and rolled. While the principal function of wallpaper has been to provide a decorative covering, lately attempts have been made to produce wallpaper which can be made to provide sound and/or heat insulation so that a conservation of thermal energy as well as minimization and/or abatement of noise pollution can be achieved. Typical such prior art attempts are illustrated by U.S. Pat. No. 2,562,711 to Gessler et al., U.S. Pat. No. 3,511,335 to Uddenborg, U.S. Pat. No. 3,542,638 to Kenny, U.S. Pat. No. 3,591,401 to Snyder et al., U.S. Pat. No. 3,637,458 to Parrish, and U.S. Pat. No. 3,778,337 to Maud et al. However, all but one of the foregoing prior art attempts to produce an insulating wall covering have utilized a laminated structure having lamina of different compositions and properties. U.S. Pat. No. 3,511,335 to Uddenborg, on the other hand, utilizes a perforated intermediate layer and facing layers which are glued to one another through the perforations in the intermediate layer.

The present invention, on the other hand, provides an improved insulated wallpaper which has fire-retardant properties and which is relatively inexpensive to manufacture. The insulated wallpaper of the present invention is particularly well suited for use in family rooms, children's play rooms, music rooms, and the like.

SUMMARY OF THE INVENTION

The present invention contemplates a multilayer, quilted wallpaper web with insulating and fire-retardant properties. The web comprises a non-woven, fibrous, fire-retardant facing sheet having a face side provided with a decorative pattern and a back side, an intermediate synthetic resin foam insulating layer of microporous structure which is substantially coextensive with the facing sheet and one side of which is contiguous to the back side of the facing sheet, and a backing sheet which is substantially coextensive with the insulating layer and contiguous to the other side of the insulating layer. The facing sheet and the backing sheet are relatively thinner than the insulating layer and are secured thereto at spaced intervals so as to form a quilted unitary web. If desired, the backing sheet can be provided with a pressure-sensitive adhesive layer, covered by a release sheet, for attachment to a wall surface.

DESCRIPTION OF THE PREFERRED EMBODIMENTS

Figure 1:
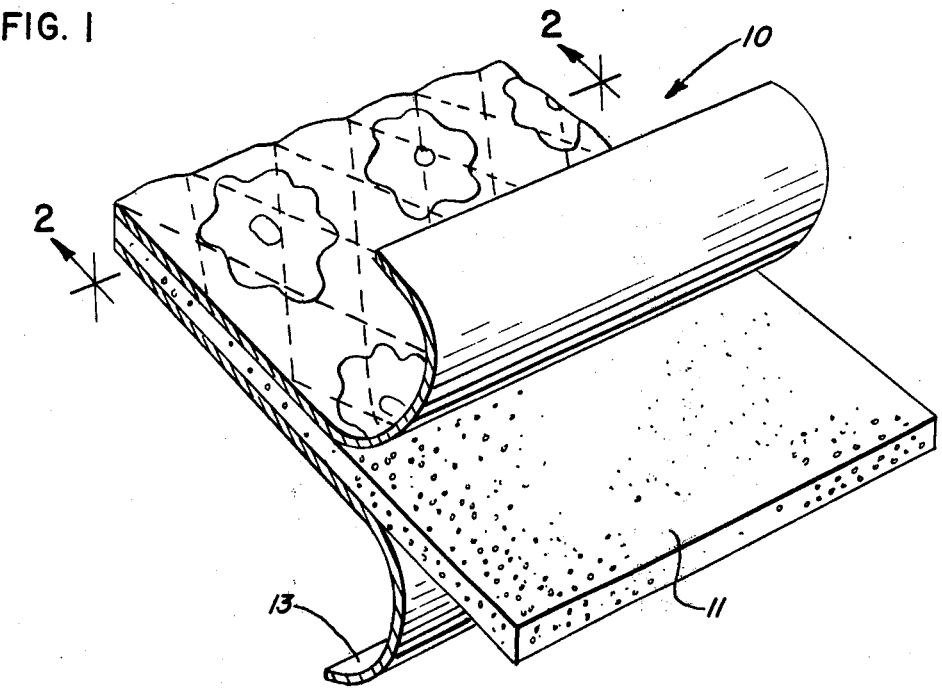
FIG. 1 is a perspective view of a wallpaper web portion embodying this invention, with parts of the facing sheet and the backing sheet pulled away to show internal structure.
Figure 2:
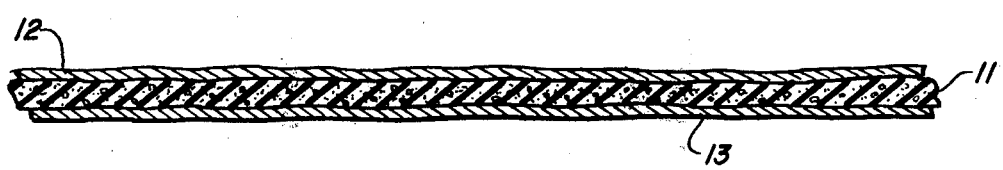
FIG. 2 is sectional view taken along line II—II in FIG. 1.

Referring to FIGS. 1 and 2, insulating wallpaper web 10 is provided with intermediate layer 11 made of an insulating material, e.g., a foamed synthetic resin having a microporous structure. Facing sheet 12, bearing a decorative pattern on the face side thereof, is fire-retardant, non-woven fibrous web substantially coextensive with insulating layer 11 and is superposed on layer 11 so that the back side of facing sheet 12 is contiguous to one side of insulating layer 11. Preferably, the fibers in facing sheet 12 do not support, i.e., do not sustain combustion, but when ignited give off a gas which douses the flame. Backing sheet 13 can also be a non-woven web of fibers similar to the fibers of facing sheet 12 and is substantially coextensive with insulating layer 11 and is contiguous to the other side of insulating layer 11. Both facing sheet 12 and backing sheet 13 are secured to insulating layer 11 by stitching with thread in any convenient manner, e.g., so as to form a quilt pattern as shown in FIG. 1. Alternatively, in instances where the insulating layer is a thermoplastic material, the insulating layer can be first sandwiched between a desired backing sheet and a facing sheet, and the resulting assembly thereafter bonded together in a quilted unitary web by applying ultrasonic energy thereto, for example, by passing the assembly past an ultrasonic horn. In a similar manner, dielectric means can be utilized to bond intermittently a facing sheet and a backing sheet to the insulating layer.

Figure 3:
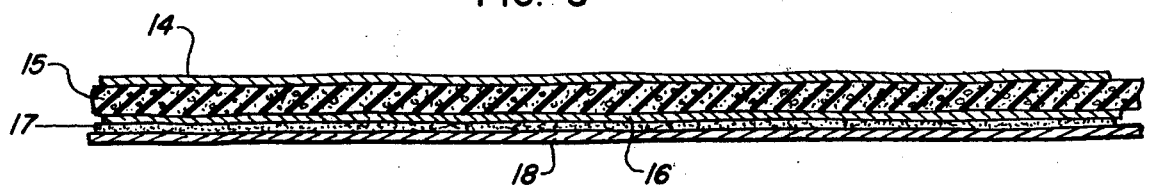
FIG. 3 is a sectional view similar to that in FIG. 2 and showing an embodiment of this invention wherein the backing sheet is provided with a layer of pressure-sensitive adhesive covered by a release sheet.

To facilitate application of the insulated wallpaper to a wall, the backing sheet can also be provided on the exposed side thereof with a layer of coating of a pressure-sensitive adhesive which is covered by an appropriate release sheet until ready for use. This is illustrated in FIG. 3 wherein facing sheet 14 of a non-woven fabric overlies insulating layer 15 made of foamed synthetic resin having a microporous structure. Non-woven backing sheet 16 is bonded to the underside of insulating layer 15 and is provided with pressure-sensitive adhesive layer 17 which is covered by release sheet 18. When the insulated wallpaper web is ready to be used, release sheet 18 is simply peeled off, exposing adhesive layer 17.

Preferably, the insulating layer is a flexible synthetic resin foam having relatively low thermal conductivity, such as foamed polyalkylenes, e.g., foamed polypropylene and foamed polyethylenes, also foamed polystyrene, polyvinyl chloride foam, a styreneacrylonitrile foam, flexible polyurethane foam, latex rubber foam, and the like, having a microporous structure. Particularly preferred is polypropylene microfoam. If desired, flameretardant materials can be incorporated into the insulating layer, for example, by admixing with the sythetic resin formulation before foaming, by chemical union with the foam formulation ingredients, by sizing the fibers used to form the batt, or in any other convenient manner. Suitable flame retardants for this purpose are antimony oxychlorides, titanium oxychlorides, borax, aluminum hydrate, aliphatic amine phosphates, alkylamine bromides and borates, and the like.

The facing sheet is relatively thinner than the insulating layer and can be selected from a wide variety of fire-retardant materials, depending on the desired surface texture, the desired decorative pattern, and the like considerations. Suitable are webs of woven and non-woven fabrics, calendered papers, embossed papers, papers surfaced with a metal foil or leaf, flock-printed papers, duplex papers, and the like. Particularly preferred are non-woven webs that are made of fibers which are inherently fire-retardant, such as, non-woven webs made from polyester fibers and biconstituted fibers bound with a binder comprising a copolymer of vinylidene chloride and an acrylic ester. The preferred biconstituted fiber contains about 50 percent by weight of a vinyl chloride and vinyl acetate copolymer fiber (commercially available under the designation "Vinyon") and about 50 percent by weight of a vinal fiber, i.e., a poly(vinyl alcohol) type fiber. The relative amounts of polyester fiber and biconstituted fiber can vary from about 75 weight percent polyester fiber and about 25 weight percent biconstituted fiber to about 90 weight percent polyester fiber and about 10 weight percent biconstituted fiber. Particularly preferred inherently fire-retardant, non-woven webs are those made from about 83 percent by weight polyester fibers and about 17 percent by weight biconstituted fibers bound with a copolymer of vinylidene chloride and an acrylic ester.

Alternatively, a fire-retardant substance can be incorporated into the facing sheet, either by impregnating the facing sheet therewith, or by distributing the aforesaid inherently fire-retardant fibers, or the like, between the facing sheet and the foam insulating layer and securing the distributed inherently fire-retardant fibers in place by stitching as the insulating wallpaper is fabricated, or by adhesive spray droplets, fiber binder droplets, or similar means.

The backing sheet also is relatively thinner than the insulating layer and its selection is based on considerations such as compatibility with adhesives used to hand wallpaper, strength, or the like. Suitable materials for this purpose are webs of non-woven fabrics, webs of woven fabrics, and the like. If desired, the backing sheet can also be made from the same fire-retardant non-woven web material as the facing sheet.

The foregoing specification and drawings are illustrative and are not to be taken as limiting. Still other variations and modifications are possible without departing from the spirit and scope of this invention.

What is claimed is:

1. an insulating, quilted multilayer wallpaper web which comprises a fire-retardant facing sheet which is a non-woven fabric web containing inherently fire-retardant fibers which do not sustain combustion but which give off a flame-dousing gas when ignited, an intermediate synthetic resin foam insulating layer of microporous structure substantially coextensive with said facing sheet and having one side contiguous to the back side of said facing sheet; and a backing sheet substantially coextensive with said insulating layer and contiguous to the other side of said insulating layer; said facing sheet and said backing sheet being relatively thinner than said insulating layer and being secured to said insulating layer by intermittent bonding to form a quilted unitary web.

2. The quilted insulating wallpaper in accordance with claim 1, wherein the insulating layer is a polypropylene microfoam and wherein said facing sheet and said backing sheet are intermittently bonded to said insulating layer by stitching.

3. The quilted insulating wallpaper in accordance with claim 1 wherein said non-woven fabric web contains about 75 to about 90 percent by weight polyester fiber and about 25 to about 10 percent by weight biconstituted fiber bound with a binder comprising a copolymer of vinylidene chloride and an acrylic ester, and wherein said biconstituted fiber contains about 50 percent by weight of a vinyl chloride and vinyl acetate copolymer fiber and about 50 percent by weight of a vinal fiber.

4. The quilted insulating wallpaper in accordance with claim 1 wherein said non-woven fabric web contains about 83 percent by weight polyester fiber and about 17 percent by weight biconstituted fiber bound with a binder comprising a copolymer of vinylidene chloride and an acrylic ester, and wherein said biconstituted fiber contains about 50 percent by weight of a vinyl chloride and vinyl acetate copolymer fiber and about 50 percent by weight of a vinal fiber.

5. The quilted insulating wallpaper in accordance with claim 1 wherein fire-retardant fibers which no not sustain combustion but which give off a flame-dousing gas when ignited are distributed between said facing sheet and said insulating layer secured in place.

6. The quilted insulating wallpaper in accordance with claim 5 wherein said fire-retardant fibers are biconstituted fibers and polyester fibers bound with a binder comprising a copolymer of vinylidene and an acrylic ester, and wherein said biconstituted fibers contain about 50 percent by weight of a vinyl chloride and vinyl acetate copolymer fiber and about 50 percent by weight of a vinal fiber.

7. The quilted insulating wallpaper in accordance with claim 5 wherein said fire-retardant fibers are biconstituted fibers containing about 50 percent by weight of a vinyl chloride and vinyl acetate copolymer fiber and about 50 percent by weight of a vinal fiber.

* * * * *